United States Patent
Maag et al.

(10) Patent No.: US 12,183,871 B2
(45) Date of Patent: Dec. 31, 2024

(54) PRESSURE MODULE, IN PARTICULAR FOR LITHIUM-ION BATTERY CELLS

(71) Applicant: Oerlikon Friction Systems (Germany) GMBH, Bremen (DE)

(72) Inventors: Michael Maag, Herrieden (DE); Jessica Uhlemann, Bubenreuth (DE); Markus Gradler, Erlangen (DE); Tobias Fritz, Seukendorf (DE); Thomas Ubler, Nuremberg (DE); Heribert Walter, Bamberg (DE)

(73) Assignee: Oerlikon Friction Systems (Germany) GMBH, Bremen (DE)

( * ) Notice: Subject to any disclaimer, the term of this patent is extended or adjusted under 35 U.S.C. 154(b) by 504 days.

(21) Appl. No.: 17/605,625

(22) PCT Filed: Apr. 30, 2020

(86) PCT No.: PCT/EP2020/062021
§ 371 (c)(1),
(2) Date: Oct. 22, 2021

(87) PCT Pub. No.: WO2020/221856
PCT Pub. Date: Nov. 5, 2020

(65) Prior Publication Data
US 2022/0209281 A1 Jun. 30, 2022

(30) Foreign Application Priority Data
May 2, 2019 (DE) .......................... 102019111356.3

(51) Int. Cl.
*H01M 10/6555* (2014.01)
*H01M 10/04* (2006.01)
(Continued)

(52) U.S. Cl.
CPC ... *H01M 10/0481* (2013.01); *H01M 10/0525* (2013.01); *H01M 10/653* (2015.04);
(Continued)

(58) Field of Classification Search
CPC .......... H01M 10/0481; H01M 10/653; H01M 10/6555; H01M 10/6557; H01M 10/6567;
(Continued)

(56) References Cited

U.S. PATENT DOCUMENTS

| 2006/0063067 | A1 | 3/2006 | Kim | |
| 2011/0052960 | A1* | 3/2011 | Kwon | H01M 10/0481 429/120 |

(Continued)

FOREIGN PATENT DOCUMENTS

| EP | 1701404 A1 | 9/2006 |
| EP | 2293376 A2 | 3/2011 |
| EP | 3223357 A1 | 9/2017 |

OTHER PUBLICATIONS

Written notification from the authority responsible for the international preliminary examination, "Schriftlicher bescheid der mit der internationalen vorlaufigen prufung beauftragten behorde," International Application PCT/EP2020/062021 dated Apr. 30, 2020.
(Continued)

*Primary Examiner* — Jane J Rhee
(74) *Attorney, Agent, or Firm* — Hinckley, Allen & Snyder; Stephen Holmes

(57) ABSTRACT

The invention relates to a pressure module (1) for a battery cell, wherein: the pressure module is an elastomer component for compensating for swelling, and has a simultaneous cooling or heating function, for rechargeable batteries; and the pressure module (1) comprises an outer covering (2) made of a polymer material which surrounds a cavity (9) that has a channel structure; and connections for the inlet (5) and
(Continued)

Figure 1:
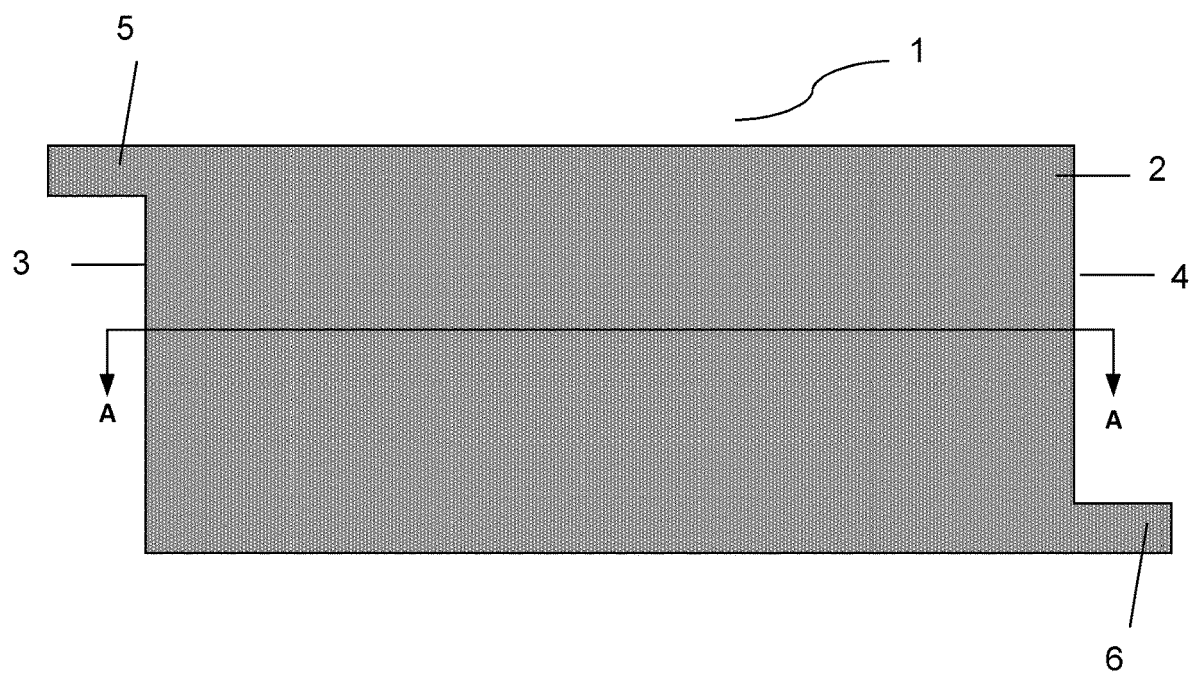

outlet (6) for the thermal transfer medium are provided in the outer covering (2); wherein the outer covering (2) has two main faces opposite one another which are interconnected via the edges thereof, wherein structural elements (10a, 10b; 19a, 19b) are provided on the inner faces (7, 8) and are arranged so as to correspond to one another and to interact with one another so as to define and stabilise the channel structure for conducting the thermal transfer medium.

17 Claims, 5 Drawing Sheets

(51) Int. Cl.
    *H01M 10/0525*     (2010.01)
    *H01M 10/653*     (2014.01)
    *H01M 10/6557*     (2014.01)
    *H01M 10/6567*     (2014.01)
    *H01M 50/202*     (2021.01)
    *H01M 50/227*     (2021.01)
    *H01M 50/264*     (2021.01)

(52) U.S. Cl.
    CPC ... *H01M 10/6555* (2015.04); *H01M 10/6557* (2015.04); *H01M 10/6567* (2015.04); *H01M 50/202* (2021.01); *H01M 50/227* (2021.01); *H01M 50/264* (2021.01)

(58) Field of Classification Search
    CPC .......... H01M 10/0525; H01M 50/202; H01M 50/227; H01M 50/264
    See application file for complete search history.

(56) References Cited

U.S. PATENT DOCUMENTS

2013/0071720 A1    3/2013   Zahn
2018/0331338 A1*  11/2018  Roderus .............. H01M 50/204
2020/0006820 A1    1/2020   Cha

OTHER PUBLICATIONS

Notification on sending of the international preliminary report on patentability, "Mitteilung Uber Die Ubersendung des internationalen vorlaufigen berichts zur patentierbarkeit," International Application PCT/EP2020/062021 dated Apr. 30, 2020.

Notification of the submission of the international research report and the written decision of the international investigative agency or the declaration, "Mitteilung Uber Die Ubermittlung Des Internationalen Recherchenberights Und Des Schriftlichen Bescheids Der Internationalen Recherchenbehorde Oder Der Erklarung," International Application PCT/EP2020/062021 dated Apr. 30, 2020.

* cited by examiner

PRESSURE MODULE, IN PARTICULAR FOR LITHIUM-ION BATTERY CELLS

The present invention relates to a pressure module for rechargeable batteries, in particular for lithium (Li) ion batteries (LIBs). The pressure module serves for the compensation of mechanical loads in the event of a change in volume of the battery cell during operation (charging and discharging) and, at the same time, for cooling or heating/temperature control.

LIBs have a high energy density for a relatively low weight and small space requirement. Therefore, they are already utilized in numerous fields of application for effective energy storage. An especially prominent example of their application is electromobility, such as, for example, as an energy source in electric vehicles or so-called hybrid vehicles.

Typically, for the operation, a number of battery cells are combined to form a battery module and two or more battery modules are combined to form a battery pack or battery stack.

The cells and/or modules can be connected in parallel and/or in series.

For use in electric vehicles, the individual modules are clamped together with one another in order to ensure, for example, a defined dimension of the entire module and to counteract any impairment of the mechanical integrity owing to shaking.

There exist battery cells in various sizes and shapes, such as cylinder cells, for example, or flat cells, such as prismatic cells or so-called pouch cells (coffee bag cells). Pouch cells have a flexible housing, which, as a rule, is composed of aluminum foil that is coated with plastic on both sides. Flat cells, such as pouch cells or prismatic cells, are preferred in regard to a better heat dissipation and stackability.

A typical construction of a LIB is as follows, beginning from the anode side:
- an anode with a current collector (as a rule, copper), which, at least on the side facing the cathode, is coated with an active material (as a rule, graphite),
- a separator for the electronic separation of the electrodes, which, however, is permeable for Li ions, and
- a cathode with a current collector (as a rule, aluminum), which, at least on the anode side, is coated with an active material (commonly a transition metal oxide with cobalt, manganese, or nickel), which, during the charging of the cell, releases Li ions, and
- an electrolyte (as a rule, liquid or solid), which acts as a mediator between the reactions at the electrodes and ensures the transport of Li ions.

Suitable materials for the active materials for the cathode and the anode, the separator, and the electrolyte are prior art.

During the charging process, Li ions migrate from the cathode to the anode and intercalate there in the host lattice (intercalation); during the discharging, the reverse process occurs, with Li ions migrating from the anode to the cathode (deintercalation).

During operation, a surface film ("solid electrolyte interphase" (SEI)) forms both on the anode and on the cathode and is permeable for ions. This surface film serves as a passivation layer and prevents undesired reactions of the active electrode material with the electrolyte.

However, the formation of the SEI also leads to an increase in the thickness of the cell, which can amount to up to 2-10% of the original cell thickness at the beginning of the start-up of operation.

During the charging process, the LIBs expand perpendicular to their layer structure and once again contract during the discharging process. The intercalation and deintercalation of lithium ions result in a volume change of the electrode coating, which can amount to up to 10% of the cell thickness. In the process, there occurs a swelling of the host lattice, such as, for example, the graphite lattice, of the anode.

The repeated swelling and detuminescence of the electrodes, in particular, the anode, as well as the increase in the thickness of the cells due to aging can lead in pretensioned modules to a large increase in the mechanical forces acting on the cells and, in turn, to a premature aging of the cells. Therefore, for the prevention of a premature failure of the cells, it is necessary to compensate for these forces.

For a smooth operation of the battery cell, it is important that the anode coating has a good mechanical and thus also a good electric contact to the current collector. The mechanical load resulting from the swelling and detuminescence of the cells causes a partial detachment of the layer of the anode, made of active material, from the current collector, a loss of contact of the particles made of active material with one another, and a breakdown of the individual particles into smaller grains.

This initially mechanically triggered aging process leads to the formation of cracks in and between the particles of the anode coating, made of active material, as a result of which fresh surfaces are formed. These fresh fractured surfaces do not yet have the thin protective surface film or solid electrolyte interphase (SEI), which is formed only through chemical reaction between the electrolytes and the lithium ions coming from the cathode. The new formation of the SEI taking place on the fresh surfaces withdraws Li ions from the system, which are then no longer available for the charging-discharging cycle and, in consequence thereof, leads to a reduction in the charging capacity.

A further key aspect in the operation of a battery cell relates to the temperature control (cooling/heating) of the battery cell. Ideally, LIBs should be operated in a temperature range between 15 and 35° C. in order to prevent a premature aging, even for high charging cycles.

Mechanical and/or thermal load of the battery cells can lead to severe damage to and even burning of the battery cell and, in the worst case, can lead to a so-called "thermal runaway" with uncontrolled spread of a fire and even explosion of the cells.

A suitable pressure module should therefore combine various properties in it:
- it should be mechanically self-supporting but allow a certain flexibility in terms of twisting and bending,
- it should be possible to circulate a liquid medium through it,
- it should be adaptable ideally for cooling and heating over the battery cell surface—for example, it should be possible to circulate the battery cells with a heatable heat transfer medium to warm them up,
- it should have a high thermal conductivity toward the cells, and
- it should have an elastically deformable surface layer for better coupling to uneven surfaces of a battery cell and for distribution of the pressure load on the anode layers of a battery stack in order to counteract any mechanical deformation of the battery cells.

Therefore, the object of the present invention is to provide a pressure module for rechargeable batteries, in particular LIBs, that combines in it the above-mentioned desired properties, that is, that can compensate for the mechanical load on account of the swelling during operation or at least can effectively reduce it and, at the same time, makes possible a temperature control of the cell, whereby, during operation, a desired temperature range can be maintained.

This object is achieved by a pressure module for a battery cell, wherein the pressure module comprises an outer covering, which surrounds a cavity that has a channel structure, wherein the outer covering has two main surfaces opposing each other, which are interconnected via the edges thereof, wherein structural elements are provided on the inner faces and are arranged so as to correspond to one another and to interact with one another so as to define and stabilize the channel structure for conveying the heat transfer medium, and connections for the inlet and outlet for the heat transfer medium are provided in the outer covering.

The connections can be connected to conduits, which can be provided along opposing edge regions of the main surfaces and extend from one end to the opposite end of the main surfaces.

The module according to the invention combines in it various important aspects for a flawless operation of a rechargeable battery cell containing a LIB. On the one hand, the mechanical load resulting from the "swelling" during charging/discharging is counteracted and, on the other hand, at the same time, an efficient temperature control of the battery cell is made possible, so that the battery cell can be operated in the optimal temperature range. Furthermore, an effective cooling, even at high charging/discharging rates, is made possible. Through these measures, the loads that the battery cell is subject to during operation are substantially reduced and, in consequence thereof, the lifetime as well as the performance and safety are significantly prolonged or increased, respectively.

The swelling compensation can be assisted by conveying a fluid medium through the pressure module. In accordance with the invention, the fluid medium is used at the same time for heat transfer.

The module according to the invention has an outer covering with two opposing main surfaces, which are interconnected along the edges thereof. The connection of the main surfaces can also occur via lateral surfaces.

The shape of the module according to the invention is governed usually by the shape of the battery cells. For example, it can have a flat rectangular shape when it is to be used in connection with rectangular battery cells, such as prismatic cells or pouch cells. However, other shapes are also conceivable and possible. For example, the pressure module according to the invention can have a square, circular, or other shape, depending on the shape of the corresponding battery cell to which the pressure module is to be coupled.

The pressure module according to the invention can be a curved or wavy plate, such as, for example, for use for cylindrical battery cells.

The dimensions of the main surfaces are determined by the shape of the pressure module. As a rule, the longest dimensions, such as, for example, the length and width in the case of rectangular or square basic shapes and the diameter in the case of a round basic shape. For example, rectangular pouch cells have a typical dimension of L=350 mm and B=100 mm and prismatic cells have a typical dimension of, for example, 230 mm×115 mm.

In regard to a compact arrangement of the battery system and the desired, smallest possible space requirement, the thickness of the module according to the invention is advantageously thin in comparison to the dimensions of the main surfaces.

The thickness of the pressure module can lie, for example, at 0.7 to 1.2 mm and in particular at 0.8 to 1.0 mm. Depending on the requirements of the applied case, however, the thickness can also be chosen to be smaller or larger.

The outer covering is formed from an at least partially flexible elastomer material, such as, for example, a silicone elastomer or a polyurethane elastomer. Preferably, the partially flexible elastomer materials have a Shore hardness A of A 20 to A 60 or a Shore hardness 00 of 00 20 to 00 80.

The outer covering can be produced by means of a conventional casting method, such as those known for elastomer materials, whereby it is equally possible, depending on need, to co-cast structures like conduits, connections to a heating/cooling system, and/or channel-forming structural elements.

The partially flexible elastomer material lends to the outer covering the desired elastic deformability for a better coupling, even on uneven surfaces.

Furthermore, the outer covering serves for the homogeneous transmission of pressure onto the battery cell. It is thereby possible to transmit pressures of 0.3 to 0.6 MPa safely and securely with complete recovery when the pressure is relieved.

For battery cells or battery cell stacks with structured uneven surfaces, it is possible to use softer polymer materials for the outer covering, which can more readily adapt to the surface structures, so that a good contact between the pressure module and the surface of the battery cell can be ensured.

A good contact between the pressure module and the surface of the battery cell is a prerequisite for a good heat transfer. The pressure module should also have with respect to the battery cells a sufficiently high thermal conductivity of at least 0.5 W/mK and preferably of at least 1 W/mK.

The outer covering surrounds a cavity that has a channel structure for conveying a heat transfer medium. The inner sides of the main surfaces have raised structural elements, which project into the cavity and have an arrangement that is mutually corresponding.

The structural elements interact with one another so as to define the channel conduction for the heat transfer medium and to stabilize the channel conduction, so that, even when there is a pressure load imposed from the outside, a free cross-sectional volume is kept open and can be circulated by the medium.

In accordance with a first embodiment, the structural elements have a series of bar-shaped sections, which are arranged at a spacing from one another along the length extension of the inner faces. Between adjacent sections, there is situated in each case a trough-shaped depression that defines a flow channel, which is connected to the conduits. The width of the sections is smaller than the cross-sectional width of the trough-shaped depressions. The height of the sections can correspond to the depth of the trough-shaped depressions, but, if necessary, can also be smaller or larger.

The bar-shaped sections of the opposing inner faces are arranged offset to one another, so that, in the arrangement, one section comes to rest on the one inner face above a depression, that is, a flow channel, of the other inner face. This results in an alternating sequence of bar-shaped sections and flow channels along the length extension of the inner faces.

When there is a pressure load, the sections of the inner faces are pressed into the depressions of the opposing inner faces. A maximum approach is achieved once the front faces of the sections contact the bottom of the respectively opposing depression and rest on it.

Because the width of the bar-shaped sections is smaller than the cross-sectional width of the flow channels, lateral cross-sectional portions of the flow channels remain open even when there is a pressure load and are able to ensure the free flow.

Once the front faces of the sections have reached the bottom of the respectively opposing depression and rest on it, an ongoing pressure compensation is still possible only via deformation of the channel structures and/or of the outer covering.

The trough-shaped depressions or flow channels can extend parallel to the transverse axis over the module surface. However, their course can also have another shape, for example, a serpentine or meandering course. The number and width of the sections, that is, of the flow channels, can be chosen as necessary. For example, the cross-sectional width of the flow channels can vary between 0.1–≥10 mm, preferably between 0.5 mm and 3 mm.

The depth of the channel structures through which a flow can circulate can also be chosen as necessary and can typically lie between 0.1 and 0.3 mm and in particular 0.1 mm and 0.3 mm.

In place of the bar-shaped sections with intervening trough-shaped depressions, it is also possible to use further shapes of structural elements, which interact to create a channel structure through which a flow can circulate.

Further structural elements can be raised elements of any shape, such as, for example, nubs, which are provided on the inner faces and project into the cavity. Analogously to the flow channel structure of the above-described embodiment with sections and flow channels, the nubs of the one inner face are arranged offset with respect to the nubs on the opposing inner face. In the pressure module, the inner faces of the main surfaces that are furnished with the nubs lie opposite each other, with the nubs on the one side coming to rest above the free cross-sectional areas between the nubs on the opposing side. When there is a pressure load, the nubs of the one side are pressed into the free cross-sectional areas of the other side, whereby, however, the nubs do not occupy the entire free intervening volume, but rather free regions remain between the nubs as open cross-sectional areas through which a flow can circulate.

The shape of the nubs can be chosen at will. The nubs can have a cylinder shape, a truncated cone shape, or a shape with a polygonal cross-sectional area. Preferably, they have a flat front face, which, when there is a pressure load, rests against a free cross-sectional area in the pressure module and can support the main surfaces of the pressure module against each other.

The arrangement and number of the nubs can vary as necessary, but is to be adequately chosen such that they can stabilize the cross-sectional area over which a flow is to circulate even under a pressure load and the cross-sectional area over which a flow is to circulate can be kept passable for the heat transfer medium.

In this embodiment with nub-shaped raised elements, it is possible to dispense with conduits, because the flow of the heat transfer medium through the pressure module from the inlet to the outlet is ensured by the free cross-sectional area between the nubs.

Once, above a certain pressure load, the front faces of the bar-shaped sections or nubs on the one inner face contact the bottom of the free cross-sectional areas on the other inner face, it is still possible to compensate for further pressure only by means of elastic deformation of the outer covering. To this end, it is possible to provide compressible materials in selected regions of the outer covering, such as, for example, foams, such as elastomer-based foams.

Thus, regions made of foam can be provided along the side edges of the outer covering between the main surfaces. An intermediate layer made of foam can extend along the side edges between the main surfaces. When there is a pressure load, the compressible regions are pressed together and absorb the pressure.

The channel-forming raised structural elements, such as the bar-shaped sections and nubs, can be placed directly on the inner sides of the main surfaces of the pressure module. For example, they can be molded on the inner faces and can form an integral unit with the outer covering.

It is possible to provide a reinforcement plate between the inner face and the cavity, whereby, in this case, the structural elements are provided on the side of the reinforcement plate that faces the cavity.

Especially suitable are reinforcement plates made of a fiber composite plastic. The choice of the plastic for the polymer matrix is governed by the requirements of the application. It is possible to use an elastomer, a thermoset plastic, or a thermoplastic.

The fiber material, too, can be chosen depending on the in requirements of the application. Suitable examples are ceramic fibers, but also carbon fibers.

It is favorable to arrange fiber materials as a fabric or web with a multiaxial fiber orientation. It is also possible to utilize two or more unidirectional fiber layers with different fiber orientation.

If need be, fillers can be added to the polymer material for the matrix for mechanical stabilization. Examples of suitable fillers for the mechanical stabilization are ceramic fillers, such as, for example, $Al_2O_3$ particles; ceramic fillers have proven to be especially favorable in bimodal blends, to which the filler is added in differing grain sizes from a coarse grain to a fine grain. In this way, it is possible to achieve especially dense packings, because the small grains can intercalate in cavities or gaps formed by the coarse grains.

On the free surface between the raised structural elements, a thin layer made of a compressible material can be provided.

The compressible material can be a compressible plastic, in particular a foam.

For increasing the pressure compensation, it is possible for an intermediate layer of foam to extend along the edge region of the pressure module all around the cavity between the main surfaces.

The foam for the thin layer on the free surfaces and/or for the intermediate layer can be produced from an elastomer, a thermoset plastic, or a thermoplastic. Preferred in regard to deformability is a foam made of an elastomer.

In principle, the structural elements made of any desired polymer material can be fabricated, for example, from an elastomer, a thermoplastic, or a thermoset plastic. The choice of a suitable material for the structural elements is governed by the configuration of the pressure module on the one hand and the function of the structural elements on the other hand. Thus, the structural elements serve, on the one hand, as spacers for the stabilization of the channel structure and contribute, on the other hand, also to the relief of pressure.

In regard to these two functions, structural elements made of an elastomer are especially appropriate.

However, it is also possible to use structural elements made of a thermoplastic or a thermoset plastic.

For embodiments with compressible intermediate layers, such as, for example, an edge strip between the main surfaces made of a foam, etc., the relief of pressure can be effected by compression of the foams, so that, without anything further, it is possible to use even slightly deformable structural elements, such as, for example, structural elements made of a thermoplastic or a thermoset plastic.

The invention will be explained below on the basis of exemplary embodiments with reference to the appended figures. Illustrated in FIGS. 1 to 13 are embodiments of the module according to the invention for use on flat cells, such as, for example, prismatic cells or pouch cells. Obviously, without further ado, the pressure module can also be adapted to and utilized for other battery cell shapes.

Figure 2:
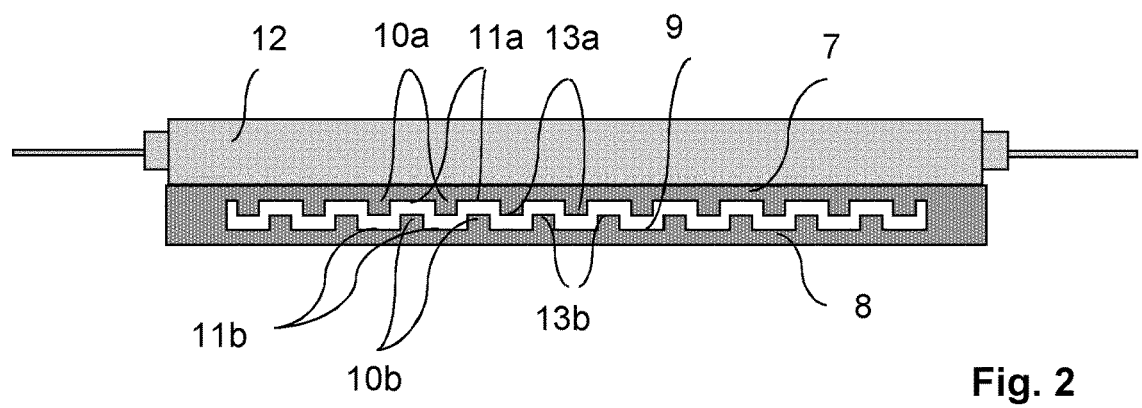
Figure 3:
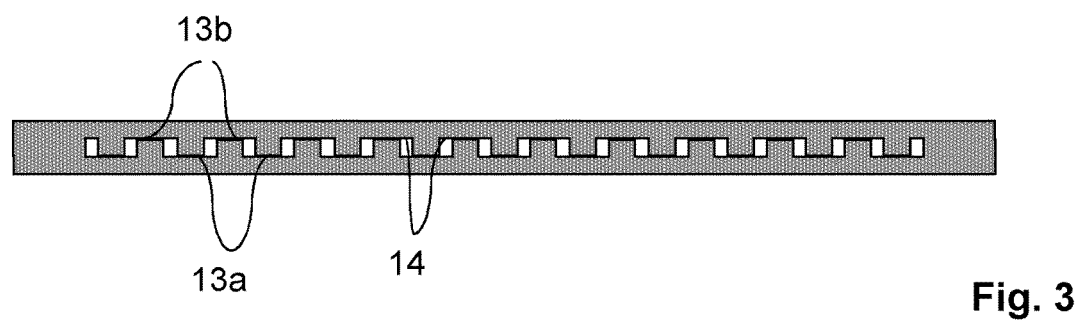
Figure 4:
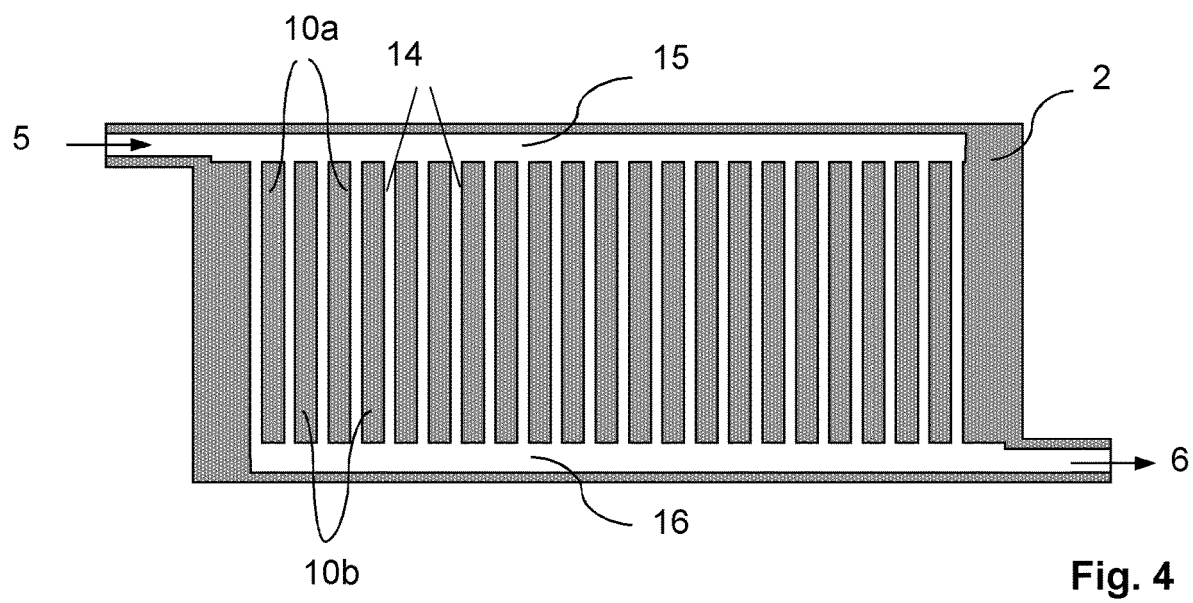
Figure 5:
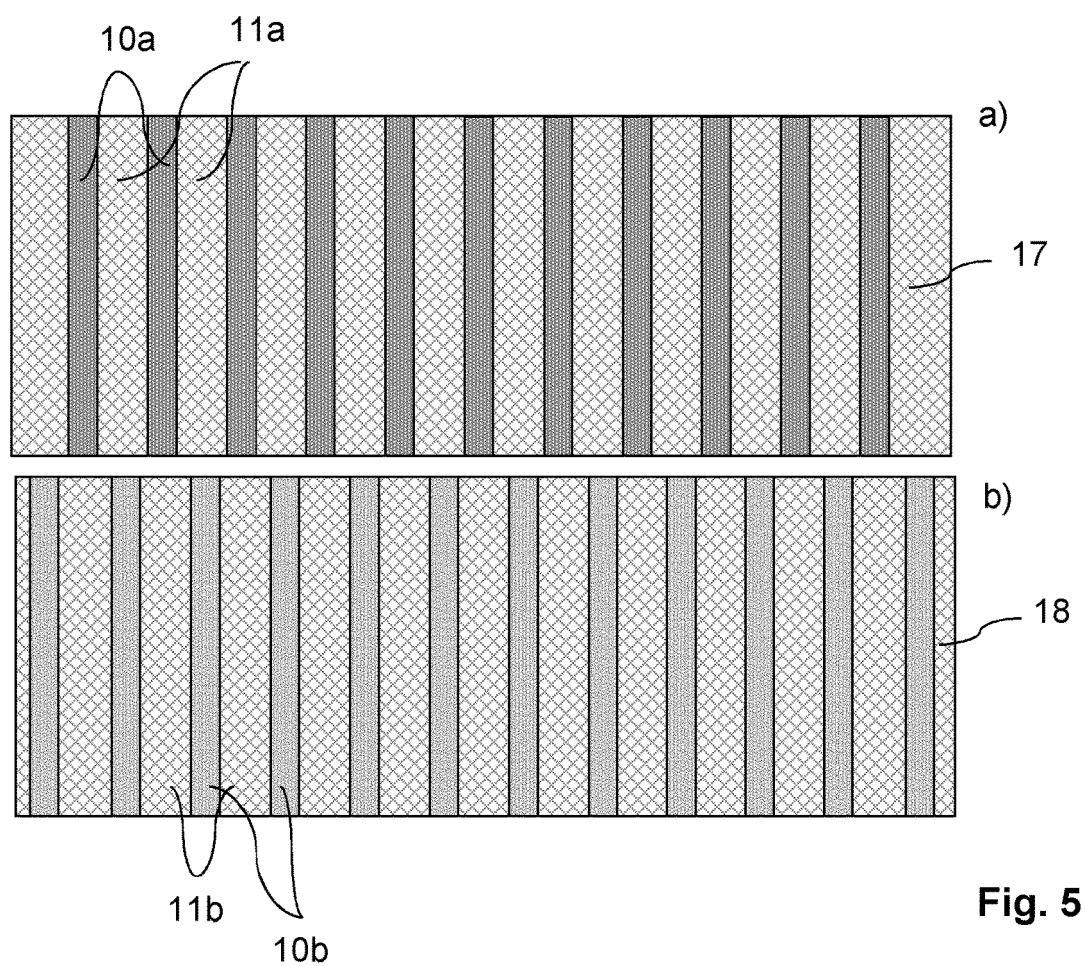
Figure 6:
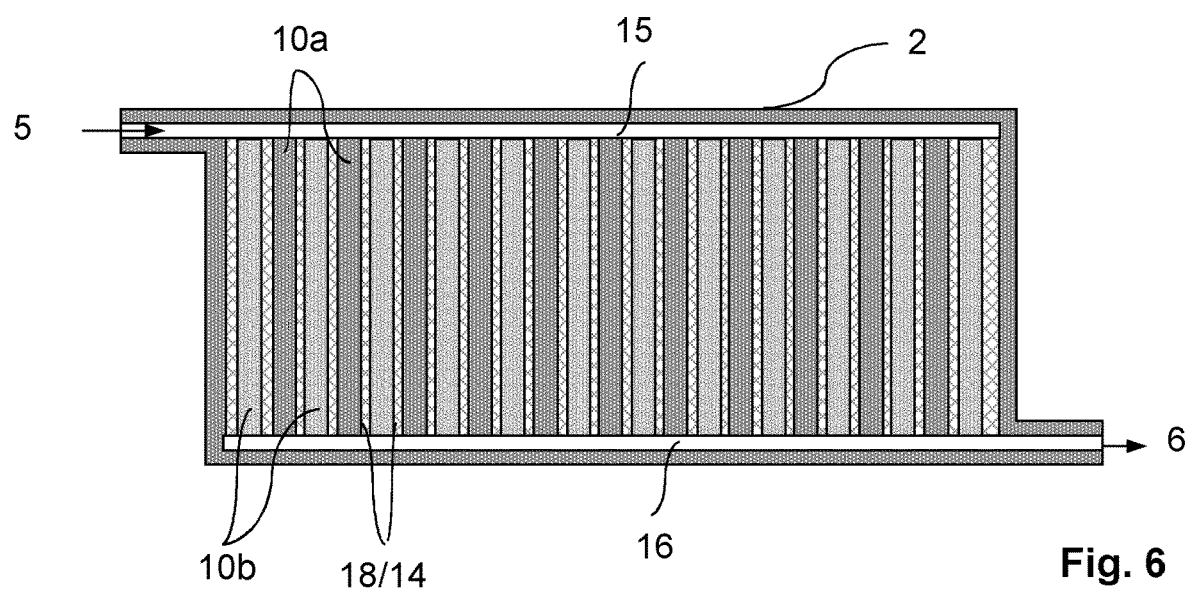
Figure 7:
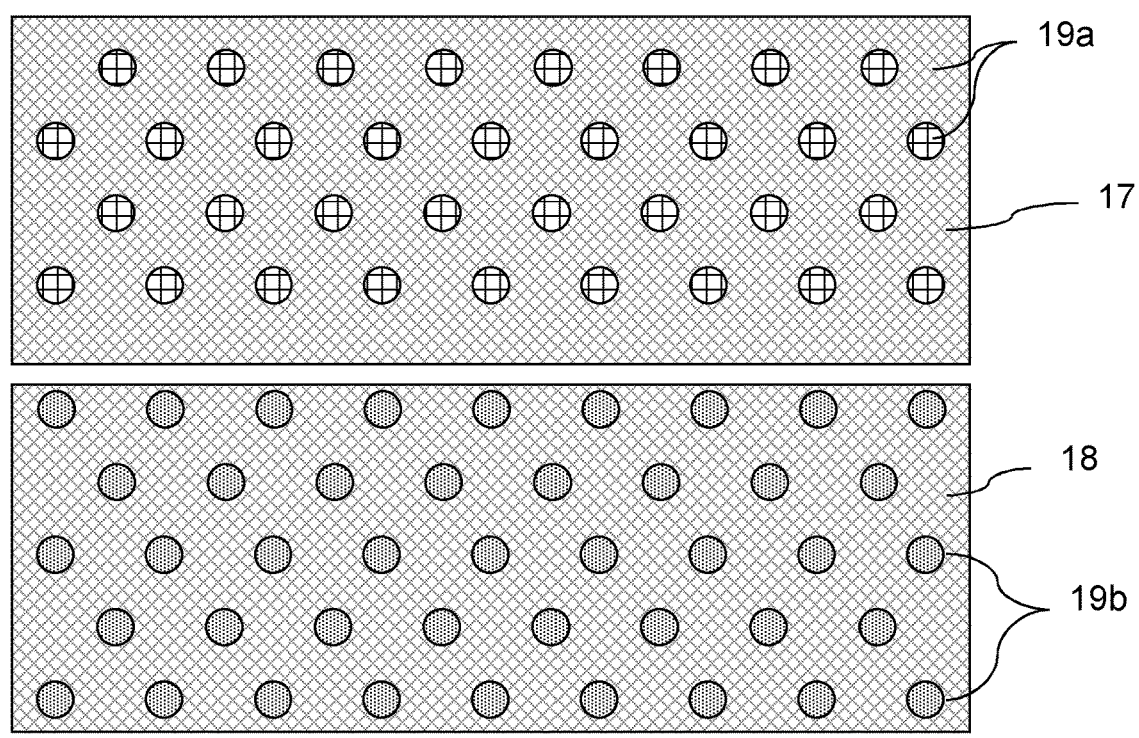
Figure 8:
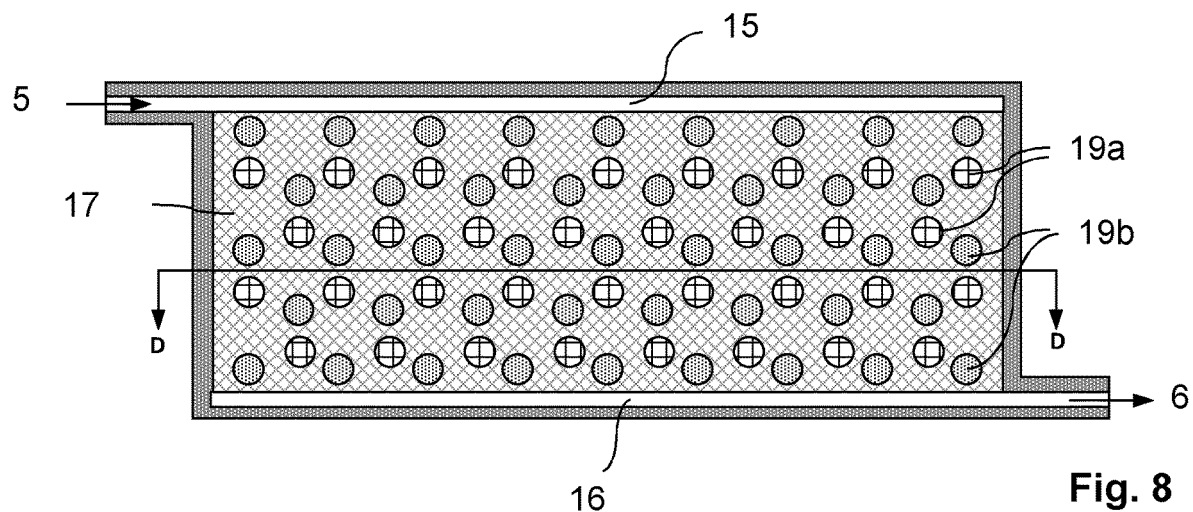
Figure 9:
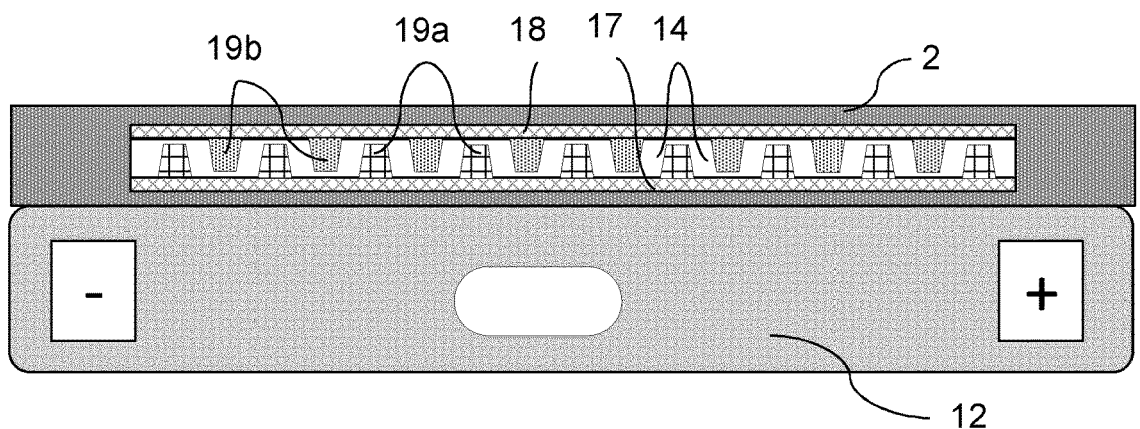
Figure 10:
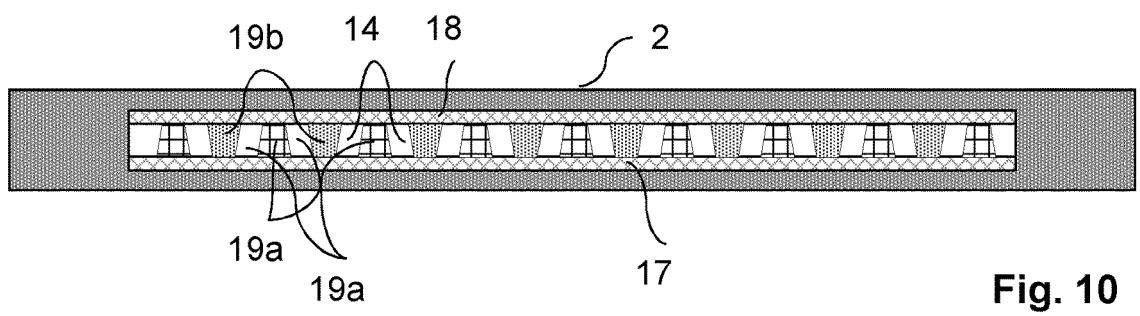
Figure 11:
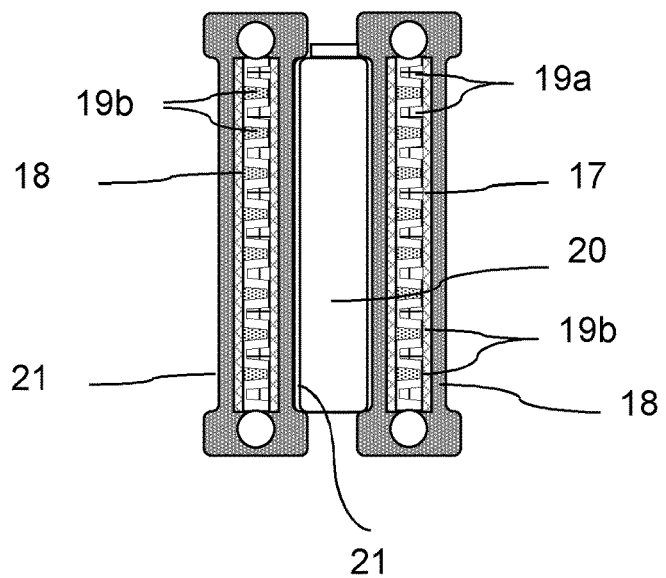
Figure 12:
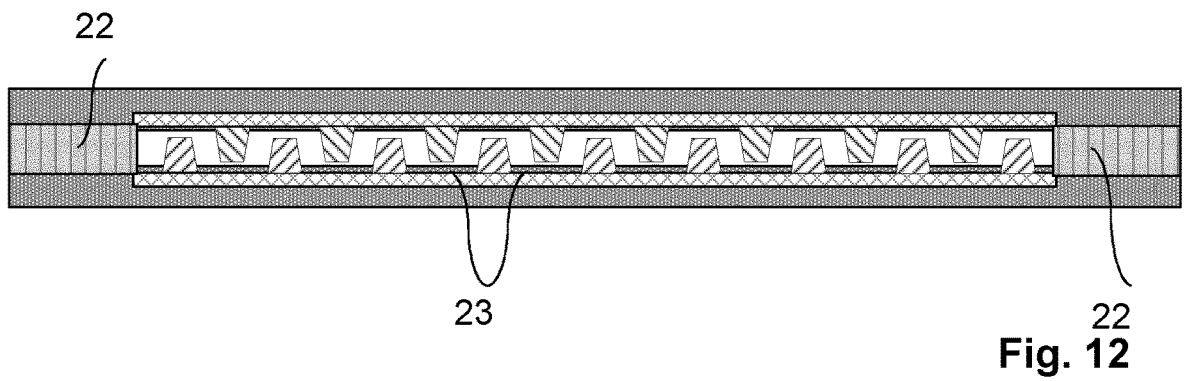
Figure 13:
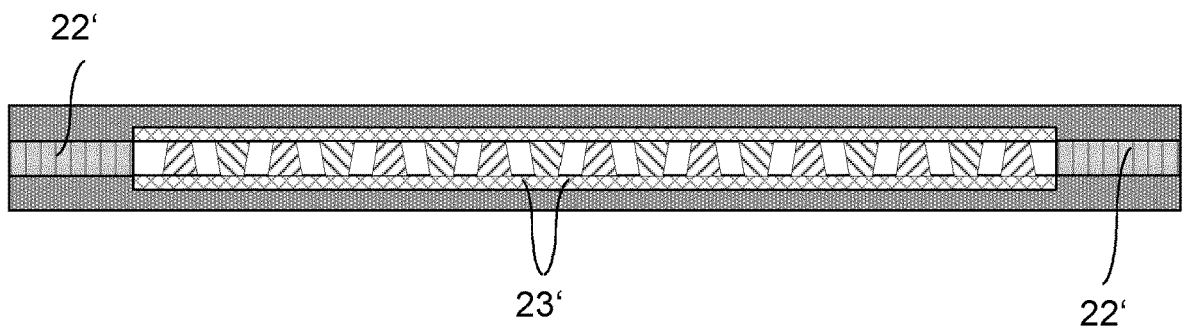

Shown are:

FIG. 1, a plan view of a pressure module according to the invention in rectangular shape;

FIG. 2, a lengthwise section cut through the pressure module in accordance with FIG. 1 with an adjoining pouch cell without a pressure load;

FIG. 3, the lengthwise section cut through a pressure module in accordance with FIG. 1 under a pressure load;

FIG. 4, a cross section through the pressure module in accordance with FIG. 1 under a pressure load;

FIG. 5a, a reinforcement plate with a channel structure made of bar-shaped sections and intervening trough-shaped depressions;

FIG. 5b, a reinforcement plate with a corresponding channel structure for the reinforcement plate in accordance with FIG. 5a;

FIG. 6, a cross section through a rectangular pressure module with reinforcement plates in accordance with FIGS. 5a and 5b, which has a channel structure consisting of channels through which a flow can circulate;

FIG. 7, a pair of corresponding reinforcement plates with nub-shaped structural elements for a further embodiment of a module according to the invention;

FIG. 8, a cross section through a pressure module having the reinforcement plates in accordance with FIG. 7 with nub-shaped structural elements under a pressure load;

FIG. 9, a lengthwise section cut through a pressure module in accordance with FIG. 8 without a pressure load with adjoining pouch cell;

FIG. 10, a lengthwise section cut through a pressure module in accordance with FIG. 9 under a pressure load;

FIG. 11, a section cut parallel to the short sides through a pressure module arrangement made up of two pressure modules in accordance with FIG. 9;

FIG. 12, a lengthwise section cut through a pressure module in accordance with a further embodiment with foam insert without a pressure load; and FIG. 13, a lengthwise section cut through the pressure module in accordance with FIG. 12 under a pressure load.

A plan view of an embodiment for a rectangular pressure module 1 is shown in FIG. 1. The pressure module 1 is surrounded by an outer covering 2. Furthermore, connections 4, 5 for the inlet and outlet of a heat transfer medium—here on the opposing short sides 6, 7—are provided. Here, the connections 4, 5 are directly molded on the outer covering 2.

A lengthwise section cut through the pressure module 1 along the line AA in FIG. 1 is shown in FIG. 2. The outer covering 2 surrounds a cavity 9 with the structural elements on the inner faces 7, 8. In this embodiment, the structural elements are bar-shaped sections 10a, 10b, which are arranged along the length extension of the inner face 7, 8 in a spaced manner, and intervening trough-shaped depressions 11a, 11b, which are defined by the separations between adjacent sections 10a, 10b of an inner face 7, 8. The sections 10a, 10b of each inner face 7, 8 are each arranged opposite a trough-shaped depression 11a, 11b on the other inner face, with the width of the separations 10a, 10b being smaller than the cross-sectional area of the depressions 11a, 11b. As a result of this, the bar-shaped sections 10a and the trough-shaped depressions 11a as well as the bar-shaped sections 10b and the trough-shaped depressions 11b form with each other corresponding pairs of structural elements, which define the channel conduction and the volume through which the heat transfer medium can flow.

Further shown is a pouch cell, which rests against one of the main surfaces of the pressure module 1.

The lengthwise section cut through the pressure module 1 in accordance with FIGS. 1 and 2 under a pressure load is shown in FIG. 3. As a result of the pressure load, the bar-shaped sections 10a, 10b are pressed into the respectively oppositely arranged trough-shaped depressions 11a, 11b until the front face 13a, 13b of each bar-shaped section 10a, 10b comes to rest on the bottom of the opposing trough-shaped depression 11a, 11b. A further pressure compensation is then possible by deformation of the structural elements as well as of the pressure module 1.

Because the width of the bar-shaped sections 10a, 10b is smaller than the cross-sectional width of the depressions 11a, 11b, a free cross-sectional volume 14 remains even under a pressure load and makes it possible for the heat transfer medium to circulate.

In the cross section through the pressure module 1 under a pressure load in FIG. 4, the alternating, adjacently lying bar-shaped sections 10a, 10b with the intervening free cross-sectional volume 14 through which a flow can circulate can be seen. Extending along each of the edge regions on the long sides of the pressure module 1 is a conduit 15, 16, each of which can communicate with the other via the trough-shaped depressions 11a, 11b or, in the state under a pressure load, via the remaining cross-sectional volume through which a flow can circulate.

In the embodiment shown in FIG. 4, one conduit 15 is connected to the connection for the medium inlet 5 and the other conduit 16 is connected to the connection for the medium outlet 6.

As necessary, however, it is also possible for both conduits 15, 16 to be each provided with a inlet and outlet or with an inlet and outlet on the same side of the pressure module. The position for the inlet or outlet of the heat transfer medium is governed in an obvious way by the requirements of the specific intended use.

In accordance with a further embodiment, it is possible to employ in the pressure module 1 carrier plates 17, 18, on which the structural elements are fixed in place. The carrier plates 17, 18 can serve for reinforcement of the pressure module 1.

Shown in FIG. 5 is a plan view of an ensemble consisting of two carrier plates 17, 18 with structural elements that are arranged corresponding to one another, whereby, for the creation of the channel structure on the carrier plates 17, 18, bar-shaped sections 10a, 10b are placed in a spaced manner and whereby the trough-shaped depressions 11a, 11b are defined by the separations. Analogously to the embodiments of FIGS. 1 to 4, the structural elements interact to form the channel conduction for conveying the heat transfer medium.

The interaction of the structural elements is illustrated in FIG. 6, which shows a cross section through a pressure module 1 with structured carrier plates 17, 18 for creation of the channel conduction under a pressure load.

The bar-shaped sections 10a, 10b of the two carrier plates 17, 18 lie adjacently in an alternating manner at a separation from one another along the length extension of the pressure module 1, whereby the heat transfer medium can flow unimpeded through the free cross-sectional volume 14 of the trough-shaped depressions 11*a*, 11*b* and thus the circulation through the pressure module 1 remains ensured.

The trough-shaped depressions 11*a*, 11*b* are connected to conduits 15, 16, which, in turn, are connected to an inlet 5 or an outlet 6 for the heat transfer medium.

A further embodiment of the structural elements for the creation of a channel conduction in a module according to the invention is shown in FIG. 7. Here, the structural elements are nubs 19, which are arranged over the module surface.

Shown in FIG. 7 is an ensemble consisting of two carrier plates 17, 18 having arrangements of hubs 19 with circular cross section that correspond to each other. The nubs 19 are arranged offset with respect to one another and interact to form the channel structures through which a flow can circulate, whereby, under a pressure load, a free surface volume remains between the nubs 19 and, even when a pressure load exists, makes possible a free circulation of the pressure module 1, as can be seen from FIG. 8.

FIG. 8 shows a pressure module 1 with structured carrier plates 17, 18 with mutually offset nubs 19 under a pressure load. As a result of the free surface volume between the nubs 19, the heat transfer medium can flow unimpeded from the inlet 5 to the outlet 6.

A section cut through the line DD in accordance with FIG. 8 is shown in FIG. 9. As can be seen from FIG. 9, the nubs 19*a*, 19*b* have a truncated cone shape. In FIG. 9, the channel structure is situated in a state in which the front faces of the nubs 19*a*, 19*b* do not yet rest against the opposing carrier plate 17, 18. In FIG. 9, the pressure module 1 is illustrated as arranged on a pouch cell.

Under a full pressure load, the front faces rest on the respectively opposing carrier plate 17, 18, as shown in FIG. 10. A further pressure compensation is now possible through deformation of the structural elements and/or of the outer covering.

For this purpose, it is possible to provide along the edge regions of the outer covering 2 between the two module halves a striplike intermediate layer 22 consisting of a foam made of an elastomer.

An embodiment of this kind is shown in FIG. 11 in cross section, with the pressure module 1 not being subject to a pressure load. Under a pressure load, not only the front faces 13*a, b* of the raised structural elements—here the nubs 19—press against the opposing surface, but additionally the foam strips of the intermediate layer 22 are pressed together along the edge.

An application of the module 1 according to the invention in accordance with FIGS. 8 to 10 is shown in FIG. 11. In FIG. 11, a prismatic cell 20 is held between two modules 1 according to the invention. For better coupling of the prismatic cell 20, the main surfaces of the pressure module 1, on which the prismatic cell comes to rest, have between the regions a depression or trough 21, which can hold the prismatic cell safely and securely. The arrangement sequence consisting of the module 1 according to the invention, the cell, etc, can be carried on as necessary.

EXAMPLES

1) Production of an Elastomer-Based Pressure Module:

The production was carried out by means of a casting method, whereby, for each half of the pressure module, a negative mold with the respective structures for the inner faces of the main surfaces was used.

The casting polymer was a cell component silicone elastomer with Shore A of 20-40 that had undergone addition crosslinking at room temperature. The two halves obtained were joined together adhesively using a joining elastomer. Subsequently, the two halves of the pressure module that had been adhesively joined were vulcanized at 120° C. for 7 hours so as thereby to obtain the finished pressure module.

2a) Production of a Structured Reinforcement Plate:

As matrix, a ceramically highly filled epoxide resin was used.

The ceramic filler was $Al_2O_3$ in bimodal blend with a blend ratio of 60% coarse grain with D50~15 pm and 40% fine grain with a D50 value that was smaller than that of the coarse grain by a factor of 10.

This blend was coated into a correspondingly structured negative mold made of steel.

Subsequently, two layers of fiberglass with a surface density of 25 g/m² were laid on it with 0/90 orientation and pressure was applied.

The fiberglass inserts were coated with the unfilled epoxide resins before being deposited.

The mold was closed and pressed in a hot press at pressures of between 10 and 50 bar and temperatures of approximately 80° C.-100° C. for 30 minutes. After cooling, the press mold was opened and the structured glass-fiber composite plate was removed. The structure consisted exclusively of the highly filled epoxide resin and exhibited a tight connection with the overlying fiber composite.

The structured plates obtained were annealed in a heating oven up to the maximum hardness of the resin matrix. In each case, two fiber composite plates with corresponding structures were then recast using an elastomer in order to finish the pressure module.

2b) Production of an Unstructured Fiber Composite Plate:

The production occurred in analogy to 2a), whereby, however, a mold without structures was utilized.

The fiber composite plate had a thickness of 0.1 mm and was still flexible.

3) Production of a Pressure Module with a Compressible Intermediate Layer:

The corresponding halves of a pressure module that were obtained according to 1) or 2a) were joined together using a foam elastomer as joining elastomer. When there is a pressure load, the foam compresses and thereby effects the pressure compensation.

LIST OF REFERENCE SYMBOLS

1 pressure module
2 outer covering
3 short side (left side of figure)
4 short side (right side of figure)
5 connection for an inlet
6 connection for an outlet
7, 8 inner faces of the main surfaces of the pressure module
9 cavity
10*a*, 10*b* bar-shaped section
11*a*, 11*b* trough-shaped depression
12 pouch cell
13*a*, 13*b* front faces
14 free volume through which a flow can circulate
15 conduit (in the figure at the inlet 5)
16 conduit (in the figure at the outlet 6)
17, 18 carrier plates 19a, 19b nubs
20 prismatic battery cell
21 depression or trough on the main surface of the outer covering
22 intermediate layer
22' intermediate layer 22 in the compressed state
23 foam support on free surface
23' foam support 23 in the compressed state

The invention claimed is:

1. A pressure module (1) for a battery cell, which has an at least partially elastomeric component for pressure compensation with, at the same time, a cooling and heating function for batteries, wherein the pressure module (1) comprises an outer covering (2) made of a polymer material, which surrounds a cavity (9) that has a channel structure and, in the outer covering (2), a connection for an inlet (5) and outlet (6) for a heat transfer medium is provided, wherein the pressure module (1) comprises two main surfaces opposing each other, which are interconnected via the edges thereof, wherein, on opposite inner faces (7, 8) of the main surfaces, raised structural elements (10a, 10b; 19a, 19b) are provided wherein the raised structural elements (10a, 10b; 19a, 19b) on the opposite inner faces (7, 8) correspond to one another and interact with one another to define and stabilize the channel structure for conveying the heat transfer medium.

2. The pressure module (1) according to claim 1, wherein, along each of two opposing edge regions of the main surfaces, a conduit (15, 16) extends, running along the edge region from one side (3) to the opposite side (4) of the pressure module (1), and the conduits (15, 16) are connected to the channel structure in the cavity (9).

3. The pressure module (1) according to claim 1, wherein the structural elements (10a, 10b) are bar-shaped sections, which are arranged at a spacing from one another along the length extension on the inner faces (7, 8), wherein trough-shaped depressions (11a, 11b) between two adjacent bar-shaped sections (10a, 10b) define a flow channel, wherein a bar-shaped section (10a, 10b) of one of the inner faces (7, 8) is arranged in each case opposite-lying to a trough-shaped depression (11a, 11b) on the opposing inner face (7, 8) and, when there is a pressure load, the bar-shaped sections (10a, 10b) engage in the respectively opposing trough-shaped depression (11a, 11b), and the width of the bar-shaped sections (10a, 10b) is chosen such that, when they engage in an opposing trough-shaped depression (11a, 11b), free cross-sectional volumes (14) remain and form an open channel structure for conveying the heat transfer medium.

4. The pressure module (1) according to claim 3, wherein, when a section (10a, 10b) engages in an opposite-lying trough-shaped depression (11a, 11b), at least lateral free cross-sectional volumes remain open.

5. The pressure module (1) according to claim 1, wherein, on the inner faces (7, 8), nub-shaped raised elements (19a, 19b) are provided and, between the nub-shaped raised elements (19a, 19b), free surfaces extend for the through-flow of the heat transfer medium, wherein the nub-shaped raised elements (19a, 19b) on the one inner face are arranged opposite to the free surface on the opposing inner face (7, 8).

6. The pressure module (1) according to claim 5, wherein the diameter of the nub-shaped raised elements (19a, 19b) is chosen such that, when there is a pressure load, a free intervening volume for conveying the heat transfer medium is formed.

7. The pressure module (1) according to claim 5, wherein the nub-shaped raised elements (19a, 19b) have a cylinder shape, a truncated cone shape, or a shape with a polygonal cross-sectional area.

8. The pressure module (1) according to claim 1, wherein the raised structural elements (10a, 10b; 19a, 19b) have a flat front face.

9. The pressure module (1) according to claim 1, wherein, along the inner faces (7, 8), a reinforcement plate (17, 18) is provided in each case and the structural elements (10a, 10b; 19a, 19b; 11a, 11b), which lie opposite to one another and face the cavity (9), are arranged on the surfaces of the reinforcement plates (17, 18).

10. The pressure module (1) according to claim 9, wherein the reinforcement plates (17, 18) are made of a fiber composite material.

11. The pressure module (1) according to claim 1, wherein, between the main surfaces along the edge of the outer covering (2), an intermediate layer (22) made of a compressible material is provided.

12. The pressure module (1) according to claim 11, wherein the intermediate layer (22) is made of a polymer foam.

13. The pressure module (1) according to claim 1, wherein the outer covering (2) is made of an elastomer.

14. The pressure module (1) according to claim 1, wherein the structural elements (10a, 10b; 11a, 11b) are made of a material chosen from among an elastomer, a thermoset plastic, or a thermoplastic.

15. The pressure module (1) according to claim 1, wherein the pressure module (1) has, at least on one of the main surfaces of the outer covering (2), a trough-shaped depression (21) for holding a battery.

16. The pressure module (1) according to claim 1, wherein said raised structural elements (10a, 10b; 19a, 19b) extending from opposing inner faces (7, 8) are arranged off-set of each other.

17. The pressure module (1) according to claim 1, wherein in the pressure-relieved state the front faces of the raised structural elements (10a, 10b; 19a, 19b) are not in contact with the opposite inner face (7, 8).

* * * * *